(12) United States Patent
Assuncao

(10) Patent No.: US 6,226,328 B1
(45) Date of Patent: May 1, 2001

(54) TRANSCODING APPARATUS FOR DIGITAL VIDEO NETWORKING

(75) Inventor: Pedro A. Assuncao, Leiria (PT)

(73) Assignee: Boom Corporation, Fremont, CA (US)

( * ) Notice: Subject to any disclaimer, the term of this patent is extended or adjusted under 35 U.S.C. 154(b) by 0 days.

(21) Appl. No.: 09/071,712

(22) Filed: May 1, 1998

(51) Int. Cl.$^7$ .............................. H04B 1/60; H04N 7/12
(52) U.S. Cl. ............................... 375/240.26; 375/240.27
(58) Field of Search ................................ 348/400–403, 348/405.1, 409–413.1, 415.1, 416.1, 420.1, 699; 382/232, 236, 238, 248, 250, 251; 375/240.26, 245; 178/405; 395/200.77; 364/514; H04B 1/66; H04N 7/12

(56) References Cited

U.S. PATENT DOCUMENTS

| | | | |
|---|---|---|---|
| 5,151,875 | 9/1992 | Sato | 364/784 |
| 5,191,548 | 3/1993 | Balkanski et al. | 358/426 |
| 5,196,946 | 3/1993 | Balkanski et al. | 358/433 |
| 5,253,078 | 10/1993 | Balkanski et al. | 358/433 |
| 5,270,832 | 12/1993 | Balkanski et al. | 358/432 |
| 5,309,567 | 5/1994 | Mizukami | 395/325 |
| 5,341,318 | 8/1994 | Balkanski et al. | 364/725 |
| 5,379,356 | 1/1995 | Purcell et al. | 382/56 |
| 5,423,010 | 6/1995 | Mizukami | 395/375 |
| 5,537,440 * | 7/1996 | Eyuboglu et al. | 375/245 |
| 5,541,852 * | 7/1996 | Eyuboglu et al. | 364/514 |
| 5,544,266 * | 8/1996 | Kopelmans et al. | 382/238 |
| 5,568,167 | 10/1996 | Galbi et al. | 348/589 |
| 5,596,376 | 1/1997 | Howe | 348/718 |
| 5,604,540 | 2/1997 | Howe | 348/405 |
| 5,608,656 | 3/1997 | Purcell et al. | 364/514 R |
| 5,608,888 | 3/1997 | Purcell et al. | 395/412 |
| 5,623,312 * | 4/1997 | Yan et al. | 348/416 |
| 5,630,033 | 5/1997 | Purcell et al. | 395/118 |
| 5,633,687 | 5/1997 | Bhayani et al. | 348/441 |
| 5,650,860 | 7/1997 | Uz | 348/430 |
| 5,686,963 | 11/1997 | Uz et al. | 348/404 |
| 5,729,293 * | 3/1998 | Keesman | 348/401 |
| 5,768,535 * | 6/1998 | Chaddaha et al. | 395/200.77 |
| 5,805,220 * | 9/1998 | Keesman et al. | 348/385 |
| 5,835,495 * | 11/1998 | Ferriere | 370/465 |
| 5,870,146 * | 2/1999 | Zhu | 348/409 |

\* cited by examiner

*Primary Examiner*—Chris Kelley
*Assistant Examiner*—Tung Vo
(74) *Attorney, Agent, or Firm*—Townsend and Townsend and Crew LLP

(57) ABSTRACT

An apparatus for transcoding an input elementary stream is provided. The apparatus includes a variety of components performing functions such as receiving the input elementary stream. A component for separating an input elementary stream into transform coefficients and their associated motion vectors is included. The apparatus also includes components for dequantizing the transform coefficients to form block transform coefficients, and determining a compensation stream using a feedback path. The apparatus combines the compensation stream from the feedback path with the block transform coefficients to form a corrected stream. The correlated stream is reduced to form an output stream having a characteristic data rate different from the characteristic data rate of the input stream. The combination of these components can provide a resultant digital video signal from the input stream.

50 Claims, 7 Drawing Sheets

TRANSCODING APPARATUS FOR DIGITAL VIDEO NETWORKING

CROSS REFERENCE TO RELATED APPLICATIONS

The following three commonly-owned copending applications, including this one, are being filed concurrently and the other two are hereby incorporated by reference in their entirety for all purposes:

1. U.S. patent application Ser. No. 09/071,432, Pedro A. Assuncao, entitled, "Transcoding Method for Digital Video Networking Applications,"

2. U.S. patent application Ser. No. 09/071,712, Pedro A. Assuncao, entitled, "Transcoding Apparatus for Digital Video Networking Applications," and 3. U.S. patent application Ser. No. 09/100,509, Pedro A. Assuncao, entitled, "Transcending System for Digital Video Networking Applications."

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PAPER APPENDIX

Select embodiments of the invention is described in an appendix attached to this application and hereby incorporated by reference in its entirety for all purposes.

BACKGROUND OF THE INVENTION

The present invention relates generally to the field of digital signal processing. Specifically, the present invention provides an effective, low-delay apparatus for transcoding to provide transmission flexibility to pre-encoded bit streams by reducing characteristic bit rates according to either channel capacity or user demand.

Numerous digital video transmission techniques have been used or proposed. Although recent developments may continue to increase the capabilities of digital storage media and the bandwidth of communications channels, most conventional applications still remain constrained by the economic impracticality of storing and transmitting large amounts of electronic information. For example, conventional techniques such as NTSC (National Television Systems Committee) video generally requires large transmission rates such as about 168 Mbits per second of uncompressed video information. In response, technologists turned to digital video compression technologies in order to eliminate any processing bottleneck caused by the transmission at such large transmission rates. Even though conventional compressed digital video technologies offer comparable picture quality and require less transmission bandwidth of conventional analog video, there are still many limitations with these technologies such as the lack of standards.

Responding to a need for standardization of compressed digital video formats, the International Organization for Standardization (ISO) adopted a standard commonly called the MPEG-2 standard protocol for combining one or more "elementary streams" of coded video, audio, or other data into a single bitstream suitable for transmission. The MPEG-2 Systems standard provides a common syntax and set of semantic rules for the construction of bitstreams containing a multiplexed combination of one or more "programs." In particular, a "program" is often composed of one or more related elementary streams. An "elementary stream" is the coded representation of a single video, audio or other data stream that shares the common time base of the program of which it is a member. For example, a network television broadcast is a program having two elementary streams: a video stream and an audio stream.

As development of the MPEG-2 Systems standard progressed, a two-level packet-based multiplexing scheme emerged. At the first level, each elementary stream to be transmitted, i.e., the coded data for one video, audio or other data stream, is packetized to form a Packetized Elementary Stream (PES). Each PES packet in a given Packetized Elementary Stream includes a PES packet header followed by a variable length payload containing the coded data of that elementary stream. The Packetized Elementary Stream structure generally provides a mechanism for packaging subparts of a longer elementary stream into consecutive packets along with associated indicators and overhead information used to synchronize the presentation of that elementary stream with other, related elementary streams (e.g., elementary streams of the same program).

At the second level, one or more Packetized Elementary Streams may be further segmented or "packetized" to facilitate combining those streams into a single bitstream for transmission over some medium. Ultimately, two different second level protocols for combining one or more Packetized Elementary Streams into a single bitstream emerged: 1) the Program Stream (PS) protocol and 2) the Transport Stream protocol. Both stream protocols are packet-based and fall into the category of transport layer entities, as defined by the ISO Open System Interconnection (OSI) reference model. Program Streams utilize variable-length packets and are intended for error-free environments in which software parsing is desired. Program Stream packets are generally relatively large (e.g., 1K to 2K bytes). Transport Streams utilize fixed length packets and are intended for transmission in noisy or error prone environments. Each Transport Stream packet comprises a header portion and a payload portion. Transport Stream packets have a relatively short length of about 188 bytes and include features for enhanced error resiliency and packet loss detection. Each group of Transport Stream packets that contain the same elementary stream data are assigned the same unique Packet ID (PID). For example, the elementary stream containing the coded video data for a network television program may be assigned a PID of "10"; the elementary stream containing the associated audio data for that program may be assigned a PID of "23," and so on.

The MPEG standard adopts a model of compression and decompression in which interframe redundancy is first removed from the color motion picture frames. To achieve interframe redundancy removal, each frames is designated either "intra" "predicted" or "bidirectional" for coding purposes. Intra frames are least frequently provided, the predicted frames are provided more frequently than the intra frames, and remaining frames are bidirectional frames. Values for every pixel in an intra frame (I) are independently provided. In a prediction frame (P), only the incremental changes in pixel values from the last I-picture or P-picture are coded. In a bidirectional frame (B), the pixel values are coded with respect to both an earlier frame and a later frame. The MPEG standard does not require frames to be stored in strict time sequence, such that the intraframe from which a predicted frame is coded can be provided in the picture sequence either earlier or later in time as the predicted frame.

Limitations arise, however, when a compressed video stream having a characteristic data rate must be transmitted through a channel of constrained bandwidth, or transmitted by hardware operating at a lower data rate. That is, conventional transmission technologies generally cannot accurately edit the compressed video steam in real time to provide a "clear" video image at a user location. Conventional transmission technologies for video applications are also extremely costly and cannot be implemented easily.

What is needed is a cost effective, apparatus for transcoding to provide transmission flexibility to pre-encoded bit streams by reducing the characteristic bit rates according to either channel capacity or user demand.

SUMMARY OF THE INVENTION

The present invention provides techniques for improved transmission of digital information. More particularly, the present invention provides an apparatus for transcoding digital packet video streams.

According to an embodiment of the present invention, an apparatus for transcoding an input elementary stream is provided. The apparatus includes a variety of components performing functions such as receiving the input elementary stream. A component for separating an input elementary stream into transform coefficients and their associated motion vectors is included. The apparatus also includes components for dequantizing the transform coefficients to form block transform coefficients, and determining a compensation stream using a feedback path. The apparatus combines the compensation stream from the feedback path with the block transform coefficients to form a corrected stream. The correlated stream is reduced to form an output stream having a characteristic data rate different from the characteristic data rate of the input stream. The combination of these components can provide a resultant digital video signal from the input stream.

In another aspect according to the present invention, an apparatus for transcoding one or more elementary streams having a characteristic input data rate in order to form an output elementary stream having an output data rate is provided. The apparatus includes a variety of components operative to perform processes such as separating the input elementary stream into motion vectors and transformation coefficients. An inverse quantization is performed on the transform coefficients to form block transform coefficients. A corrected stream is formed by summing the block transform coefficients with a compensation stream formed in a feedback loop. The corrected stream is reduced to form an output stream having a characteristic data rate equal to the target output data rate. An error representation is generated from dequantizing the output stream to form a second set of block transform coefficients, and then combining the block transform coefficients with the second set of block transform coefficients to form the error representation. In select embodiments, the error representation is converted to a time domain representation. Other emodiments use the frequency domain error representation. An error accumulation of successive frames is selectively computed by selecting a subset in both frames using the motion vectors and computing the error between these subsets. The error accumulation is converted to the compensation stream for feedback. Finally, the output stream and the motion vectors are combined to form the output elementary stream.

In another aspect according to the present invention, an apparatus for transcoding an input digital signal having an input data rate to form an output digital signal having an output data rate is provided. The apparatus includes a variety of components disposed to perform tasks such as separating the input digital signal to obtain a first transformed signal and a plurality of motion information. A component for correcting the first transformed signal with a compensation signal to generate a corrected signal is also included. The apparatus then performs the steps of reducing the corrected signal to generate a second transformed signal and then generating an error signal based on the first transformed signal and the second transform signal, where the compensation signal is generated based upon the error signal and the motion information. The apparatus then combines the second transformed digital signal and the motion information to form the output digital signal.

In another aspect according to the present invention, an apparatus for transcoding an input digital signal having an input data rate to form an output digital signal having an output data rate is provided. The apparatus performs a variety of processing such as separating the input digital signal into a first transformed signal and a plurality of motion information. The apparatus also performs reducing the first transformed signal to form a second transformed signal having the output data rate. The apparatus also includes components for generating the output digital signal from the second transformed signal and the plurality of motion information.

Numerous benefits are achieved by way of the present invention over conventional techniques. In some embodiments, the present invention is more cost effective than conventional techniques. The present invention can also provide a resultant video signal that is substantially clear for viewing. Some embodiments according to the invention are less complex than known techniques. These and other benefits are described throughout the present specification and more particularly below.

The invention will be better understood upon reference to the following detailed description and its accompanying drawings.

DESCRIPTION OF SPECIFIC EMBODIMENTS 1.0 Hardware Overview

Figure 1:
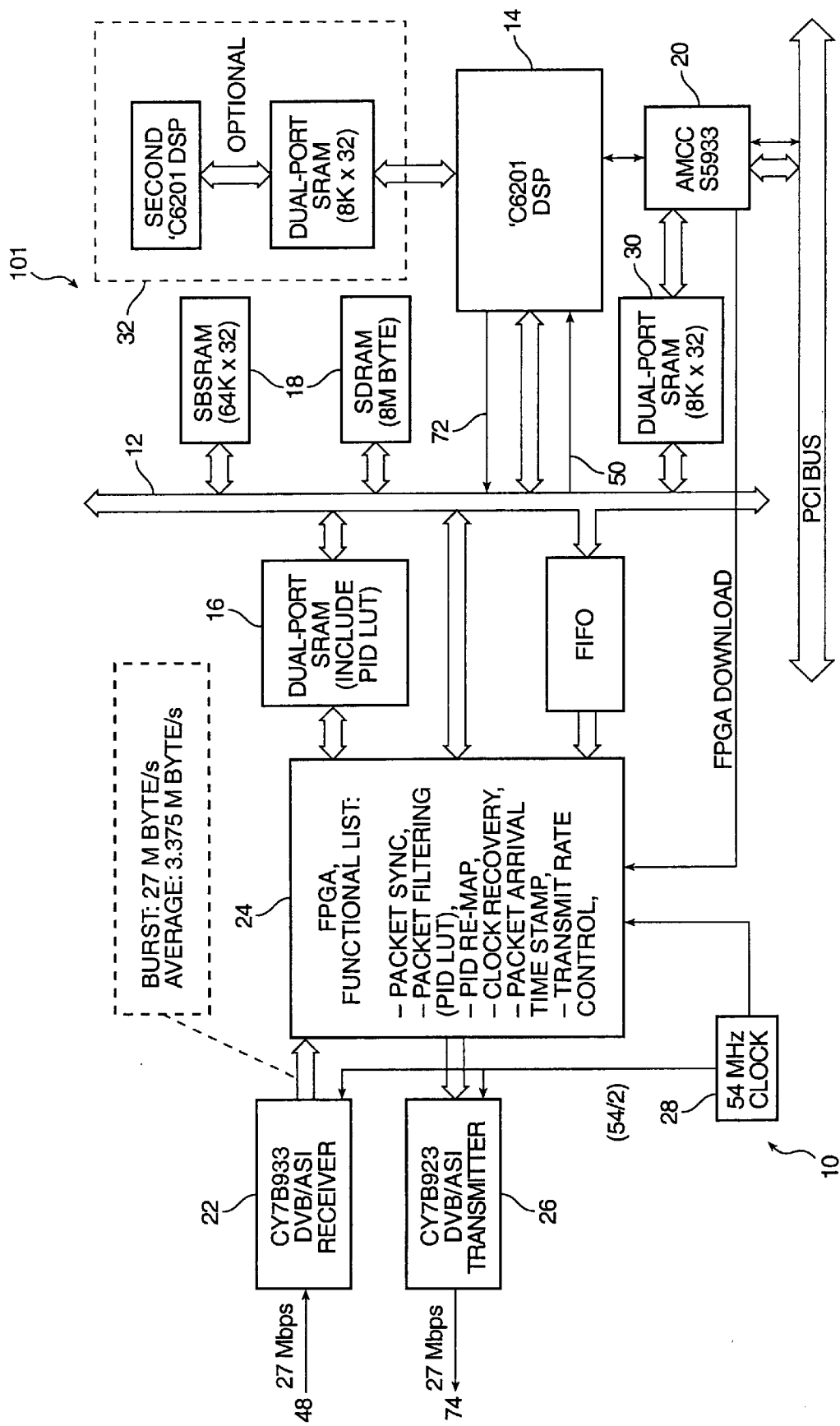
FIG. 1 depicts a simplified block diagram of a representative hardware embodiment according to an embodiment of the invention.

FIG. 1 depicts a simplified hardware block diagram 101 of a signal processing hardware in a particular embodiment according to the invention. In the representative system of FIG. 1, a processing unit 10 includes at least one bus 12, which is shown schematically as a single bus, but can also be a number of buses such as a local bus and one or more expansion buses (e.g., ADB, SCSI, ISA, EISA, MCA, NuBus, or PCI), which interconnects subsystems such as a processor 14, which in alternative embodiments may be a microcomputer, microcontroller or logic, but which preferably is a signal processor such as a C6201 or other suitable signal processor family, a dual ported image memory 16, which is preferably an SRAM, system memory 18 which may be RAM, ROM or a combination thereof, a bus interface 20, in conjunction with dual ported SRAM 30, for interconnecting processing unit 10 with a host processor.

Input processing is performed by a receiver 22 for receiving an input stream 48, a programmable logic unit 24, which may be a processor, programming logic or a functional programmable gate array (FPGA), operatively disposed to provide synchronization of incoming packets, filtering of incoming packets based upon packet header information, recovery of clock information within headers of incoming packets and time stamping of input packets, in conjunction with clock means 28. Output processing of output stream 74 is controlled by transmitter 26 connected to programmable logic unit 24.

Other devices or subsystems (not shown) may be connected in a similar manner. Also, the devices and subsystems may be interconnected in different ways, and many of the devices shown need not be present, without impairing the operation of the system. Source code to implement processing functions in accordance with the present invention may be operably disposed in system memory 18 or stored on storage media. Optionally, multiple signal processing units may be coupled together, such as optional signal processing unit 32.

2.0 Data Transcoding

A plurality of techniques may be used for transcoding elementary Streams. One technique, called open loop transcoding, provides methods of minimal transcoder complexity. One loop methods modify only encoded DCT coefficients in order to reduce the overall bit rate. A disadvantage inherent to open loop methods is that image drift introduced by the accumulation of errors in the decoder loop of these methods over multiple predicted frames (P) results in a continuous drop in picture quality. This accumulated drift error is reset to zero whenever an intra (I) frame is decoded. Instances where the transcoding error introduced in each frame is small, total distortion becomes noticeable after decoding a long string of predicted frames. Otherwise, the distortion will be noticeable after only a few frames.

Requantization methods attempt to achieve bit-rate reduction of encoded video by quantizing Discrete Cosine Transform (DCT) coefficients with a larger quantization step size. A "quantization" process weights each element of an image pixel matrix in accordance with its chrominance or luminance type and its frequency. In an intra frame (I) picture, the quantization weights are intended to reduce to one many high frequency components to which the human eye is not sensitive. In predicted (P) and bidirectional (B) pictures, which contain mostly higher frequency components, the weights are not related to visual perception. "Requantizing" or "reducing" with a larger step size results in bit rate reduction since by applying a coarser quantization, more coefficients will become zero, in turn requiring fewer variable length codes (VLC) to encode the new quantized coefficients.

Data partitioning methods may be implemented by eliminating from the DCT coefficients a subset of them according to a selected strategy. For example, discarding all coefficients below a certain threshold level (threshold sampling), or discarding the coefficients above a certain frequency (zonal sampling). The threshold can be varied to achieve a target bit rate. As applied to digital video, data partitioning is performed by establishing a priority breakpoint (PBP), such that information having a priority below the PBP is discarded, while information above the PBP is retained.

Closed loop transcoding employs a re-encoding system which fully decodes the input bit stream into the pixel domain, then subsequently encodes it again at a lower bit rate. Feedback may be used to correct transcoding distortion so that the distortion does not propagate into the successive frames. Closed loop techniques are effective, however they are also complex and costly.

Figure 2A:
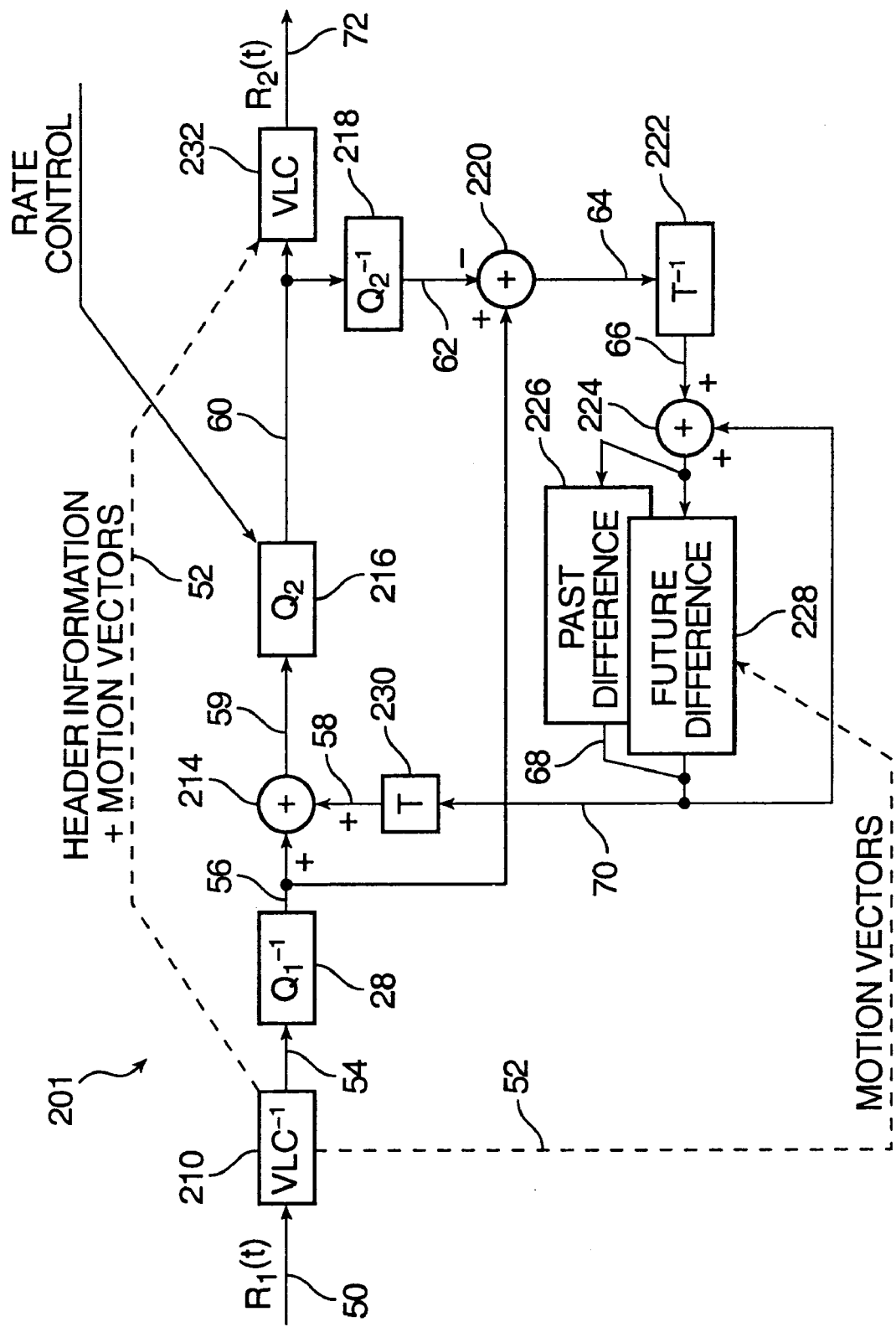
FIGS. 2A–2C depict simplified process block diagrams for representative transcoding processes according to various specific embodiments of the invention.

FIG. 2A depicts a simplified process block diagram 201 of the processes incorporated into various components in a particular embodiment according to the invention for transcoding an input elementary stream 50 into an output elementary stream 72 operatively disposed in SDRAM 16 and executed by processor 14 of FIG. 1. Variable length coding (VLC) decoder 210 extracts motion vectors 52 and a plurality of transform coefficients 54 from the input elementary stream 50. In one embodiment the transform coefficients are discrete cosine transform (DCT) coefficients. Inverse quantizer 212 converts the transform coefficients 54 to block transform coefficients 56. Summer 214 combines the block transform coefficients 56 with a compensation stream 58, generated by a feedback path, to form a corrected stream 59. Quantizer 216 reduces corrected stream 59 to a target output data rate to form an output stream 60. Inverse quantizer 218 converts the output stream 60 to form a second plurality of block transform coefficients 62. Summer 220 combines the second plurality of block transform coefficients 62 with the plurality of block coefficients 56 forming an error representation 64. Inverse DCT 222 converts error representation 64 to a first time domain representation 66. Summer 224, frame buffer 226 and frame buffer 228 enable the selective computation of an error accumulation 68 between two successive image frames in accordance with motion vectors 52 in order to determine a one frame delay 70. DCT transform 230 converts one frame delay 70 to compensation stream 58. Variable length coder 232 converts the output stream 60 and motion vectors 52 to output elementary stream 72.

Figure 2B:
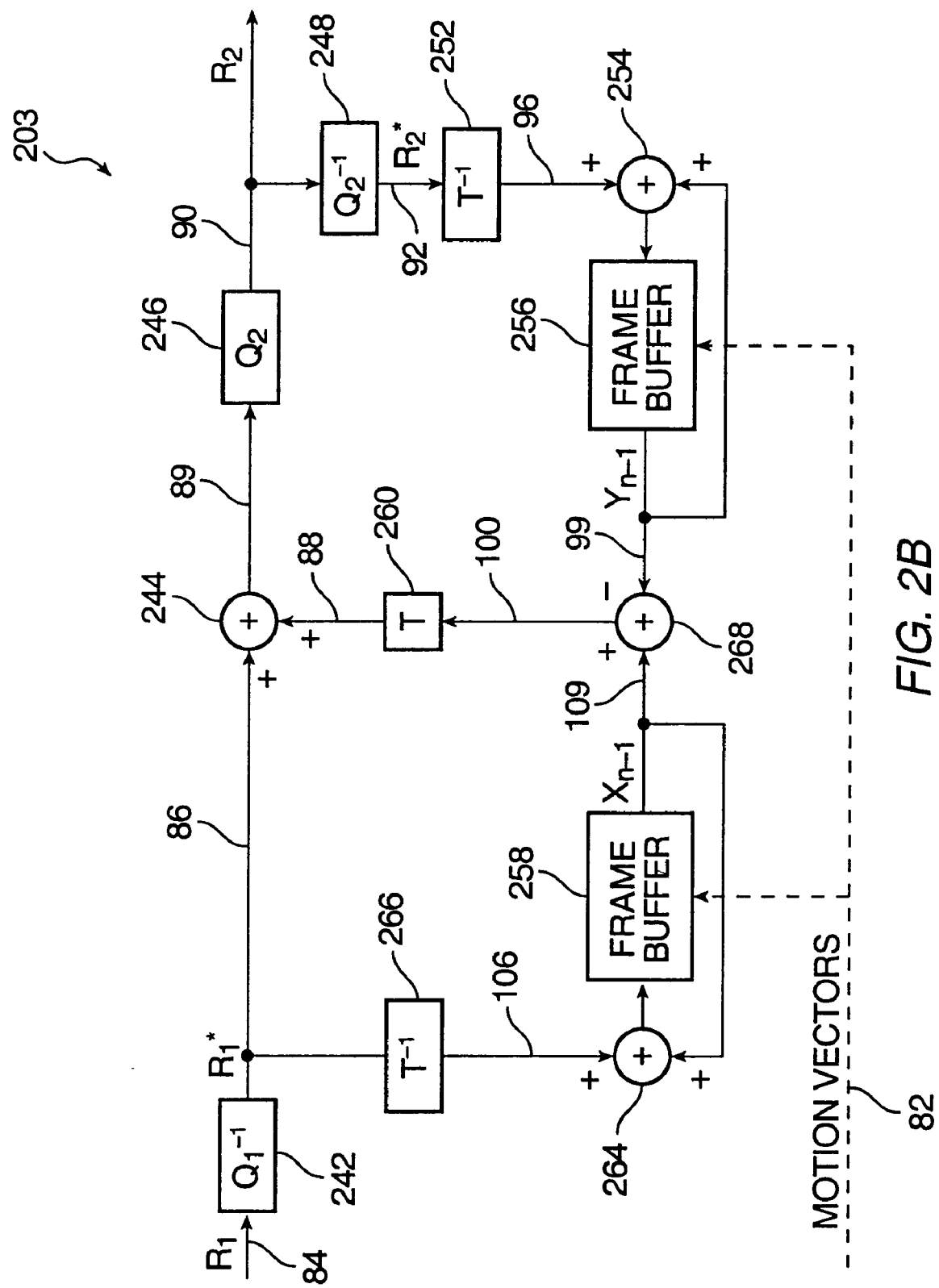

FIG. 2B depicts a simplified process block diagram 203 of the processes incorporated into various components in an alternative embodiment according to the invention for transcoding an input elementary stream 50 into an output elementary stream 72 operatively disposed in SDRAM 16 and executed by processor 14 of FIG. 1. Variable length coding (VLC) decoder 210 (not shown) extracts motion vectors 82 and a plurality of transform coefficients 84 from the input elementary stream 50. In one embodiment the transform coefficients are discrete cosine transform (DCT) coefficients. Inverse quantizer 242 converts the transform coefficients 84 to block transform coefficients 86. Summer 244 combines the block transform coefficients 86 with a compensation stream 88, generated by a feedback path, to form a corrected stream 89. Quantizer 246 reduces corrected stream 89 to a target output data rate to form an output stream 90. Inverse quantizer 248 converts the output stream 90 to form a second plurality of block transform coefficients 92. Inverse DCT 252 converts second plurality of block transform coefficients 92 to a first time domain representation 96. Summer 254, frame buffer 256 compute a first one frame delay 99 from two successive image frames in accordance with motion vectors 82. Meanwhile, Inverse DCT 266 converts block transform coefficients 86 to a second time domain representation 106. Summer 264, frame buffer 258 compute a second one frame delay 109 from two successive image frames in accordance with motion vectors 82. Summer 268 combines the first one frame delay 99 and the second one frame delay 109 to form a combined one frame delay 100. DCT transform 260 converts combined one frame delay 100 to compensation stream 88. Variable length coder 262 (not shown) converts the output stream 90 and motion vectors 82 to output elementary stream 72.

Figure 2C:
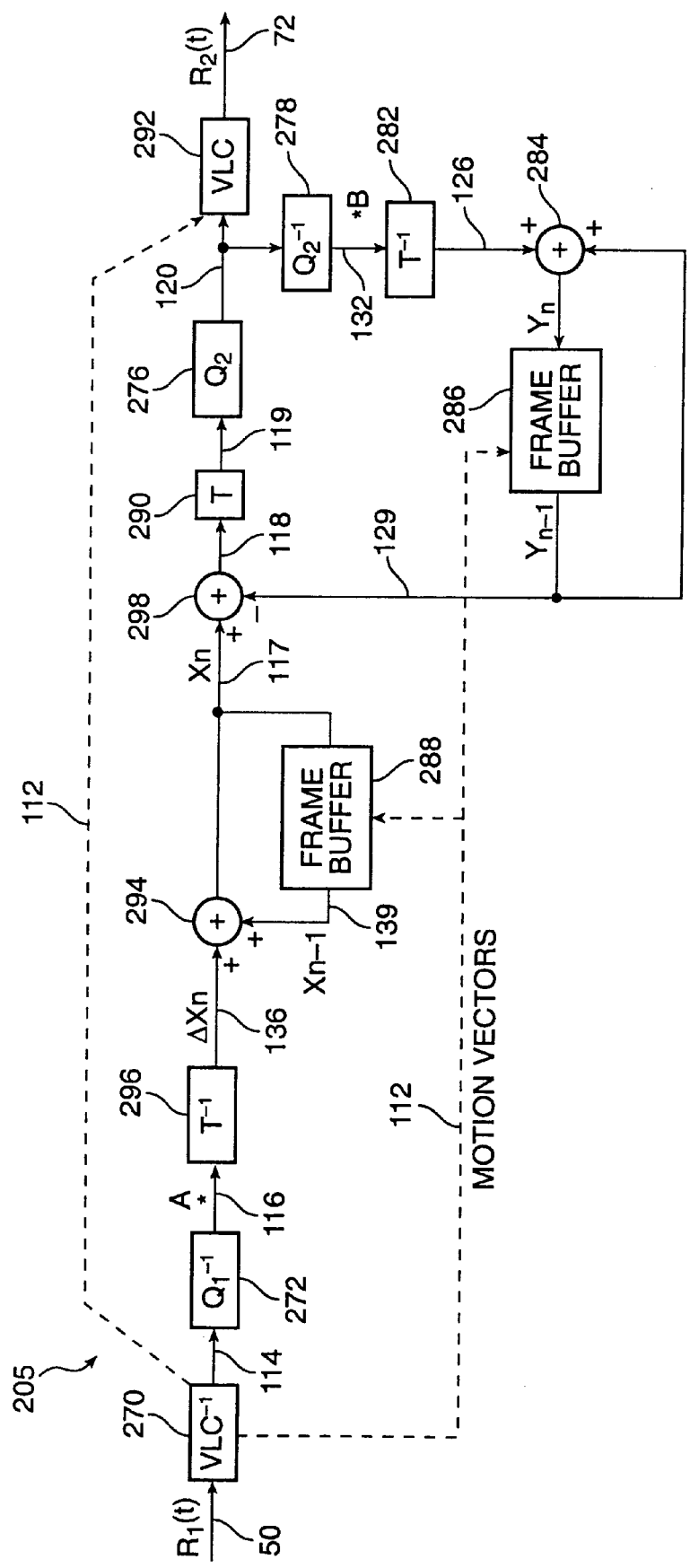

FIG. 2C depicts a simplified process block diagram 205 of the processes incorporated into various components in another alternative embodiment according to the invention for transcoding an input elementary stream 50 into an output elementary stream 72 operatively disposed in SDRAM 16 and executed by processor 14 of FIG. 1. Variable length coding (VLC) decoder 270 extracts motion vectors 112 and a plurality of transform coefficients 114 from the input elementary stream 50. In one embodiment the transform coefficients are discrete cosine transform (DCT) coefficients. Inverse quantizer 272 converts the transform coefficients 114 to block transform coefficients 116. Inverse DCT 296 converts block transform coefficients 116 to a second time domain representation 136. Frame buffer 288 computes a second one frame delay 139 from two successive image frames in accordance with motion vectors 112. Summer 294 adds the second one frame delay 139 to the second time domain representation 136 to form a decoded video stream 117. Summer 298 combines the decoded video stream 117 with a first one frame delay 129 to form a corrected stream 118. DCT transform 290 converts corrected stream 118 to a second frequency stream 119. Quantizer 276 reduces second frequency stream 119 to a target output data rate to form an output stream 120. Inverse quantizer 278 converts the output stream 120 to form a second plurality of block transform coefficients 122. Inverse DCT 282 converts second plurality of block transform coefficients 122 to a first time domain representation 126. Summer 284, frame buffer 286 compute the first one frame delay 129 from two successive image frames in accordance with motion vectors 112. Variable length coder 292 converts the output stream 120 and motion vectors 112 to output elementary stream 72.

3.0 Process

Figure 3A:
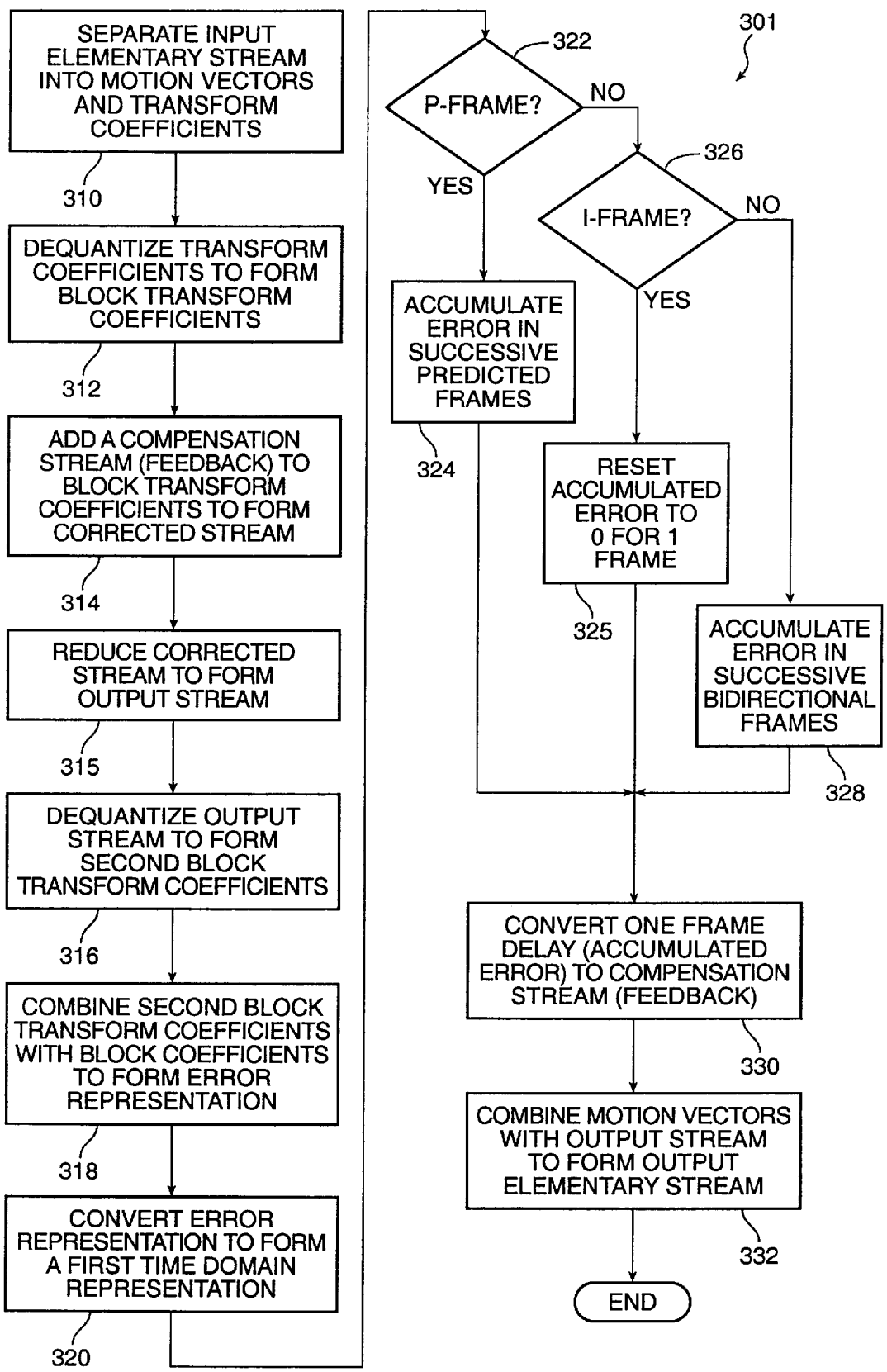
FIGS. 3A–3C depict simplified flowcharts of representative process steps according to various specific embodiments of the invention.

FIG. 3A depicts a flowchart 301 of simplified process steps incorporated into various components in a particular representative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 310, input elementary stream 50 is separated into a plurality of motion vectors 52 and a plurality of transform coefficients 54. In one embodiment the transform coefficients are discrete cosine transform (DCT) coefficients. Next, in a step 312, the transform coefficients 54 are dequantized to form a plurality of block transform coefficients 56. A feedback path is used to generate and apply an error representation 64 from the output to the input beginning with a step 314, the plurality of block transform coefficients 56 is added to a compensation stream 58, formed in a step 330 below, to form a corrected stream 59. In a step 315, the corrected stream formed in step 314 is reduced at a quantization level selected to conform the characteristic data rate of to the desired output data rate to form an output stream 60. Next, in a step 316, the output stream 60 is dequantized to form a second plurality of block transform coefficients 62. Then, in a step 318, second plurality of block transform coefficients 62 is combined with the plurality of block transform coefficients 56 produced in step 312 to form the error representation 64. In a step 320, error representation 64 is converted into a first time domain representation 66. Then in a decisional step 322, if the frame is a predicted frame (P), then in a step 324, an error accumulation computation is applied to a first frame in the first time domain representation 66 and a second frame in the first time domain representation 66, to compute error accumulation 68 by selecting a subset in the first frame and a subset in the second frame using the motion vectors separated in step 310, computing an error accumulation between the first subset and the second subset, and thereupon continuing to the next subset until error accumulation 68 has been calculated. Otherwise, if in step 322, it was determined that the frame is not a predicted (P) frame, then in a decisional step 326, if the frame is an intra (I) frame then in a step 325, error accumulation 68 is reset to zero. Otherwise, if in step 326, it was determined that the frame was not an intra (I) frame, then it must be a bidirectional frame (B). In a step 328, computation is applied in a bidirectional frame to a second frame in the first time domain representation 66 and a third frame in the first time domain representation 66, to compute an error accumulation 68 by selecting a subset in the second frame and a subset in the third frame using the motion vectors separated in step 310, computing an error accumulation between the first subset and the second subset, and thereupon continuing to the next subset until error accumulation 68 has been calculated. Irrespective of the frame type and error computation performed, error accumulation 68 comprises a one frame delay 70. In a step 330, one frame delay 70 is converted to the compensation stream 58. Finally, in a step 332, motion vectors 52 are combined with the output stream 60 formed in reducing step 314 to form an output elementary stream 72.

Figure 3B:
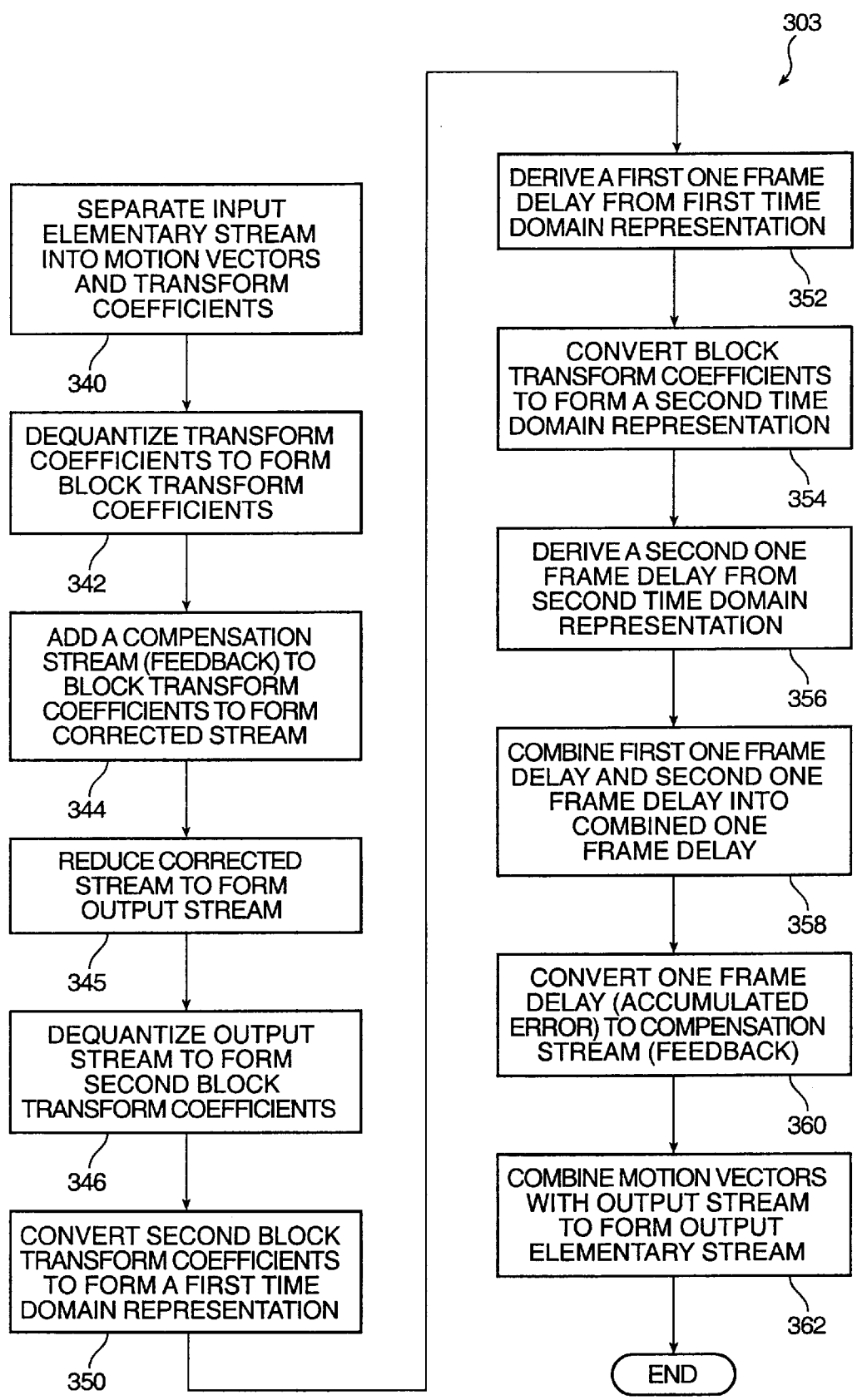

FIG. 3B depicts a flowchart 303 of simplified process steps incorporated into various components in an alternative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 340, input elementary stream 50 is separated into a plurality of motion vectors 82 and a plurality of transform coefficients 84. In one embodiment the transform coefficients are discrete cosine transform (DCT) coefficients. Next, in a step 342, the transform coefficients 84 are dequantized to form a plurality of block transform coefficients 86. A feedback path is used to generate and apply an error representation from the output to the input beginning with a step 344, the plurality of block transform coefficients 86 is added to a compensation stream 88, formed in a step 360 below, to form a corrected stream 89. In a step 345, the corrected stream 89 formed in step 344 is reduced at a quantization level selected to conform the characteristic data rate of to the desired output data rate to form an output stream 90. Next, in a step 346, the output stream 90 is dequantized to form a second plurality of block transform coefficients 92. In a step 350, second plurality of block transform coefficients 92 is converted into a first time domain representation 96. Then, in a step 352, a first one frame delay 99 is derived from the first time domain representation 96. In a step 354, plurality of block transform coefficients 86 is converted into a second time domain representation 106. Then, in a step 356, a second one frame delay 109 is derived from the second time domain representation 106. In a step 358, the first one frame delay 99 and the second one frame delay 109 are combined to form a combined one frame delay 100. In a step 360, combined one frame delay 100 is converted to the compensation stream 88. Finally, in a step 362, motion vectors 82 are combined with the output stream 90 formed in reducing step 344 to form an output elementary stream 72.

Figure 3C:
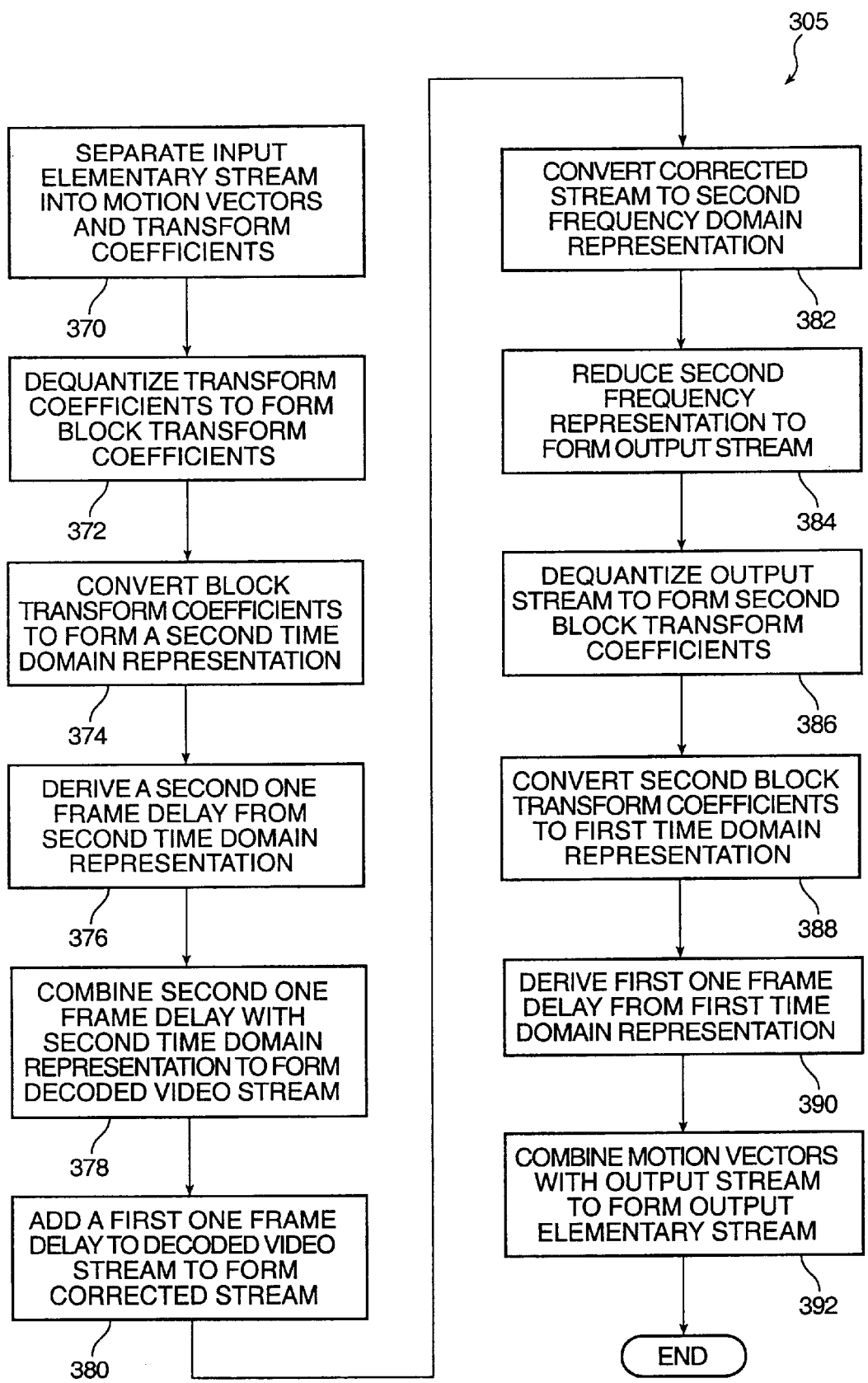

FIG. 3C depicts a flowchart 305 of simplified process steps incorporated into various components in an alternative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 370, input elementary stream 50 is separated into a plurality of motion vectors 112 and a plurality of transform coefficients 114. In one embodiment the transform coefficients are discrete cosine transform (DCT) coefficients. Next, in a step 372, the transform coefficients 114 are dequantized to form a plurality of block transform coefficients 116. In a step 374, plurality of block transform coefficients 116 is converted into a second time domain representation 136. Then, in a step 376, a second one frame delay 139 is derived from the second time domain representation 136. Then in a step 378, the second one frame delay 139 is combined with the second time domain representation 136 to form a decoded video stream 117. Then, in a step 380, the decoded video stream 117 is combined with a first one frame delay 129 generated in a step 390 to form a corrected stream 118. Next, in a step 382, corrected stream 118 is converted to a second frequency stream 119. Then, in a step 384, second frequency stream 119 is reduced to a target output data rate to form an output stream 120. Next, in a step 386, the output stream 120 is converted to form a second plurality of block transform coefficients 122. Then, in a step 388, the second plurality of block transform coefficients 122 is converted to a first time domain representation 126. Next, in a step 390, the first one frame delay 129 is derived from first time domain representation 126 in accordance with motion vectors 112. Finally, in a step 392, motion vectors 112 are combined with the output stream 120 formed in reducing step 384 to form an output elementary stream 72.

The present invention has been described in terms of specific embodiments comprised of a combination of hardware and software. Other embodiments may be created by more closely combining the various functions which make up the invention. For example, coding of an input stream and decoding of an input stream may be combined into a single form factor using methods such as incorporating both processes onto a single silicon wafer, or in a single software process. Alternatively, embodiments may be created by more distantly separating the various functions which make up the invention. Other and different processes or hardware may be substituted for those of the specific embodiments enumerated here.

4.0 Conclusion

In conclusion the present invention provides for an apparatus for transcoding to provide transmission flexibility to pre-encoded bit streams by reducing the characteristic bit rates according to either channel capacity or user demand. One advantage is that some embodiments are relatively low cost. Another advantage provided by this approach is that image drift errors are eliminated from the output elementary stream.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. An apparatus for transcoding an input elementary stream to form an output elementary stream, said apparatus comprising:
  a receiver, operative to receive said input elementary stream;
  a transmitter, operative to transmit said output elementary stream;
  a processor, coupled to said receiver and said tansmitter, said processor operatively disposed to:
    separate said input elementary stream into a plurality of motion vectors and a plurality of transform coefficients;
    dequantize said plurality of transform coefficients to form a first plurality of block transform coefficients;
    determine a compensation stream using a feedback, path further comprising:
      dequantizing an output stream to form a second plurality of block transform coefficients;
      forming an error representation from said first plurality of block transform coefficients and said second plurality of block transform coefficients;
      converting said error representation into a first time domain representation, said first time domain representation having a first frame and a second frame; and
      forming an at least one frame delay by selectively applying an error accumulation computation to said first frame in said first time domain representation and said second frame in said first time domain representation, said error accumulation being computed on said first and said second frames by selecting a first subset in said first frame and a second subset in said second frame, and computing said error accumulation between said first subset and said second subset, said first subset and said second subset selected using said motion vectors; and
      converting said at least one frame delay into said compensation stream:
    combine said compensation stream from said feedback path with said first plurality of block transform coefficients to form a corrected stream;
    reduce said corrected stream to form said output stream having a second characteristic data rate; and
    combine said output stream with said motion vectors to form the output elementary stream.

2. The apparatus of claim 1 wherein said elementary streams are MPEG-2 format digital video streams.

3. The apparatus of claim 2 wherein said compensation stream accumulates an image drift error for successive P frames.

4. The apparatus of claim 3 wherein said processor is further disposed to:
  reset said image drift error whenever an I frame is encountered in said input elementary stream.

5. The apparatus of claim 4 wherein said processor is further disposed to:
  compute said compensation stream from a successive image frame whenever a B frame is encountered in said input elementary stream.

6. The apparatus of claim 1 wherein said transform coefficients are DCT coefficients.

7. The apparatus of claim 1 wherein said reduce said corrected stream further comprises requantizing with a coarser quantization step in order to reduce bit rate.

8. The apparatus of claim 1 wherein said processor is further disposed to:
   discard high-frequency coefficients in order to reduce bit rate.

9. The apparatus of claim 1 wherein said input elementary stream comprises digitized video programs.

10. The apparatus of claim 1 wherein said input elementary stream comprises Internet traffic.

11. An apparatus for transcoding an input elementary stream, having an input data rate, to form an output elementary stream, having an output data rate, wherein said input and said outpout data rates need not be equivalent, said apparatus comprising:
   a receiver, operative to receive said input elementary stream;
   a transmitter, operative to transmit said output elementary stream;
   a processor, coupled to said receiver and said transmitter, said processor operatively disposed to:
      separate said input elementary stream into a plurality of motion vectors and a plurality of transform coefficients;
      dequantize said transform coefficients to form a plurality of block transform coefficients;
      generate an error representation by:
         reducing said first plurality of block transform coefficients added to a compensation stream, to form an output stream having data rate equal to said output data rate;
         dequantizing said output stream to form a second plurality of block transform coefficients; and
         combining said first plurality of block transform coefficients with said second plurality of block transform coefficients to form said error representation;
      convert said error representation into a first time domain representation;
      form a one frame delay by selectively applying an error accumulation computation to a first frame in said first time domain representation and a second frame in said first time domain representation, said error accumulation being computed on said first and said second frames by selecting a first subset in said first frame and a second subset in said second frame, and computing said error accumulation between said first subset and said second subset, said first subset and said second subset selected using said motion vectors:
      convert said one frame delay to said compensation stream;
      combine said plurality of motion vectors with said compensation stream to form said output elementary stream.

12. The apparatus of claim 11 wherein said elementary streams are MPEG-2 format digital video streams.

13. The apparatus of claim 12 wherein said error representation accumulates an image drift error for successive P frames.

14. The apparatus of claim 13 wherein said processor is further disposed to:
   reset said image drift error whenever an I frame is encountered in said input elementary stream.

15. The apparatus of claim 14 wherein said processor is further disposed to:
   compute said compensation stream from a successive image frame whenever a B frame is encountered in said input elementary stream.

16. The apparatus of claim 11 wherein said transform coefficients are DCT coefficients.

17. The apparatus of claim 11 wherein said reducing said plurality of block transform coefficients added to a compensation stream further comprises requantizing with a coarser quantization step in order to reduce bit rate.

18. The apparatus of claim 11 wherein said processor is further disposed to:
   discard high-frequency coefficients in order to reduce bit rate.

19. The apparatus of claim 11 wherein said input elementary stream comprises digitized video programs.

20. The apparatus of claim 11 wherein said input elementary stream comprises Internet traffic.

21. An apparatus for transcoding an input digital signal, having an input data rate, to form an output digital signal, having an output data rate, wherein said input and said output data rates need not be equivalent, said apparatus comprising:
   a receiver, operative to receive said input digital signal;
   a transmitter, operative to transmit said output digital signal;
   a processor, coupled to said receiver and said transmitter, said processor operatively disposed to:
      separate said input digital signal to obtain a first transformed signal and a plurality of motion information;
      form an error representation from said first transformed signal and a second transformed signal derived from said output digital signal;
      convert said error representation into a time domain representation;
      form an at least one frame delay in said time domain representation, by accumulating error between subsets of successive frames, said subsets selected using said motion information;
      convert said at least one frame delay into a compensation stream;
      correct said first transformed signal using said compensation stream to form a corrected signal;
      generate said output digital signal from said corrected signal and said plurality of motion information.

22. The apparatus of claim 21 wherein said input digital signal and said output digital signal comprise elementary streams.

23. The apparatus of claim 22 wherein said feedback further comprises an accumulated image drift error for successive P frames.

24. The apparatus of claim 23 wherein said processor is further disposed to:
   reset said image drift error whenever an I frame is encountered in said input digital signal.

25. The apparatus of claim 24 wherein said processor is further disposed to:
   determine accumulated error from a successive image frame whenever a B frame is encountered in said input digital signal.

26. The apparatus of claim 21 wherein said first transform signal and said second transform signal further comprise a plurality of DCT coefficients.

27. The apparatus of claim 21 wherein said output digital signal is generated by requantizing said corrected signal with a coarser quantization step in order to reduce bit rate.

28. The apparatus of claim 21 wherein said processor is further disposed to:
   discard high-frequency coefficients in order to reduce bit rate.

29. The apparatus of claim 21 wherein said input digital signal comprises digitized video programs.

30. The apparatus of claim 21 wherein said input digital signal comprises Internet traffic.

31. An apparatus for transcoding an input digital signal, having an input data rate, to form an output digital signal, having an output data rate, wherein said input and said output data rates need not be equivalent, said apparatus comprising:

a receiver, operative to receive said input digital signal;

a transmitter, operative to transmit said output digital signal;

a processor, coupled to said receiver and said transmitter, said processor operatively disposed to:

separate said input digital signal to obtain a first transformed signal and a plurality of motion information;

correct said first transformed signal with a compensation signal to generate a corrected signal;

reduce said corrected signal to generate a second transformed signal;

generate an error signal based on said first transformed signal and said second tansformed signal, wherein said compensation signal is generated based upon said error signal by converting said error signal into a time domain representation, forming an at least one frame delay between selected subsets of successive frames within said time domain representation, said subsets selected using said motion information and converting said at least one frame delay into said compensation signal; and combine said second transformed signal and said motion information to form said output digital signal.

32. The apparatus of claim 31 wherein said input digital signal and said output digital signal comprise elementary streams.

33. The apparatus of claim 32 wherein said compensation signal accumulates an image drift error for successive P frames.

34. The apparatus of claim 33 wherein said processor is further disposed to:

reset said image drift error whenever an I frame is encountered in said input digital signal.

35. The apparatus of claim 34 wherein said processor is further disposed to:

compute said compensation stream from a successive image frame whenever a B frame is encountered in said input digital signal.

36. The apparatus of claim 31 wherein said first transform signal and said second transform signal further comprise a plurality of DCT coefficients.

37. The apparatus of claim 31 wherein said reduce said corrected signal further comprises requantizing with a coarser quantization step in order to reduce bit rate.

38. The apparatus of claim 31 wherein said processor means is further disposed to:

discard high-frequency coefficients in order to reduce bit rate.

39. The apparatus of claim 31 wherein said input digital signal comprises digitized video programs.

40. The apparatus of claim 31 wherein said input digital signal comprises Internet traffic.

41. An apparatus for transcoding an input digital signal, having an input data rate, to form an output digital signal, having an output data rate, wherein said input and said output data rates need not be equivalent, said apparatus comprising:

a receiver, operative to receive said input digital signal;

a transmitter, operative to transmit said output digital signal;

a processor, coupled to said receiver and said transmiter, said processor operatively disposed to:

separate said input digital signal to obtain a first transformed signal and a plurality of motion information;

form an error representation from said first transformed signal and a second transformed signal;

convert said error representation into a time domain representation;

form an at least one frame delay in said time domain representation, by accumulating error between subsets of successive frames said subsets selected using said motion information;

convert said at least one frame delay into a compensation stream;

combine said compensation stream with said first transformed signal and thereupon reduce said compensation stream and said first transformed signal to form said second transformed signal having said output data rate; and generate said output digital signal from said second transformed signal and said plurality of motion information.

42. The apparatus of claim 41 wherein said input digital signal and said output digital signal comprise elementary streams.

43. The apparatus of claim 42 wherein said processor is further disposed to:

accumulating an image drift error for successive P frames.

44. The apparatus of claim 43 wherein said processor is further disposed to:

reset said image drift error whenever an I frame is encountered in said input digital signal.

45. The apparatus of claim 44 wherein said processor is further disposed to:

determine accumulated error from a successive image frame whenever a B frame is encountered in said input digital signal.

46. The apparatus of claim 41 wherein said first transform signal and said second transform signal further comprise a plurality of DCT coefficients.

47. The apparatus of claim 41 wherein said output digital signal is generated by quantizing said first transformed signal in accordance with a quantization step in order to reduce bit rate.

48. The apparatus of claim 41 wherein said processor is further disposed to:

discard high-frequency coefficients in order to reduce bit rate.

49. The apparatus of claim 41 wherein said input digital signal comprises digitized video programs.

50. The apparatus of claim 41 wherein said input diginal signal comprises Internet traffic.

* * * * *